United States Patent

[11] 3,610,212

| [72] | Inventor | Kunio Endo<br>Anjo-shi, Japan |
|---|---|---|
| [21] | Appl. No. | 820,975 |
| [22] | Filed | May 1, 1969 |
| [45] | Patented | Oct. 5, 1971 |
| [73] | Assignee | Nippon Denso Company Limited<br>Kiriya-shi, Japan |
| [32] | Priority | July 12, 1968 |
| [33] | | Japan |
| [31] | | 49373/68 |

[54] NEGATIVE PRESSURE DETECTOR IN INTERNAL COMBUSTION ENGINE
2 Claims, 2 Drawing Figs.

[52] U.S. Cl. ..................................................... 123/32 EA,
73/119 A, 123/32 R
[51] Int. Cl. .......................................................F02m 51/00
[50] Field of Search.............................................73/398, 119
I; 123/32 EZ; 340/195, 210; 331/65

[56] References Cited
UNITED STATES PATENTS

| 2,847,625 | 8/1958 | Popowsky | 331/65 X |
| 2,848,710 | 8/1958 | Owen | 340/210 |
| 2,883,976 | 4/1959 | Woodward et al. | 73/119 I X |
| 3,287,715 | 11/1966 | Riches et al. | 340/210 |
| 3,327,526 | 6/1967 | North | 73/398 X |
| 3,448,728 | 6/1969 | Scholl | 123/32 EI |

*Primary Examiner*—Louis R. Prince
*Assistant Examiner*—Daniel M. Yasich
*Attorney*—Cushman, Darby & Cushman ABSTRACT: Negative pressure detector in an internal combustion engine in which a detecting section for the negative pressure is formed of an oscillation coil converting the negative pressure into a variation in inductance and an oscillator detecting the variation in inductance of the oscillation coil as a variation in frequency, said detecting section for the negative pressure is arranged in the vicinity of an inlet manifold and consequently the negative pressure in the engine can be detected exactly with a good signal to noise ratio S/N.

PATENTED OCT 5 1971

3,610,212

INVENTOR
Kunio Endo

BY Cushman, Darby & Cushman
ATTORNEYS 3,610,212

1

NEGATIVE PRESSURE DETECTOR IN INTERNAL COMBUSTION ENGINE

BACKGROUND OF THE INVENTION

1. Field of the Invention

The present invention relates to negative pressure detector in an internal combustion engine adapted to an electrically controlled fuel injector, etc. in an internal combustion engine for an automobile.

2. Description of the Prior Art

In an conventional example wherein a covering element converting detected negative pressure in an engine into an electrical variation, a moving iron in a differential transformer is set to respond to negative pressure in an engine, a detecting coil arranged outside of the moving iron is inserted in one arm of a bridge circuit and the negative pressure in the engine is detected by taking a variation in inductance of the detecting coil as a variation in voltage. In another conventional example, the differential transformer is removed, a condenser is inserted in one arm of the bridge circuit instead of the detecting coil and the negative pressure in the engine is detected by taking a variation in the electrostatic capacity of the condenser due to the variation of the negative pressure in the engine as a variation in voltage by means of the bridge circuit.

But it is necessary in the conventional means mentioned above that the moving iron is miniaturized and light in weight to miniaturize the converting element such as a differential transformer and also to improve the response of the moving iron, etc. responding to the negative pressure in the engine. On the contrary, if the moving-iron, etc. is miniaturized and is made light in weight, physical displacement of the miniaturized and lightweight moving iron, etc. corresponding to the negative pressure variation in the engine becomes to small to obtain a sufficient electrical output, consequently the frequency of the voltage applied to the detecting coil, etc. must be increased, but as a result of increasing the frequency a sufficient signal to noise ratio S/N cannot be obtained because of inductive disturbance from outer circuits and attenuation due to a long connecting wire in the case wherein the differential transformer, etc. and the detecting coil of the differential transformer arranged in the vicinity of the engine are connected to one arm of the bridge circuit through the connecting wire, therefore such a disadvantage is inevitable that the exact negative pressure in the engine cannot be detected by converting that into an electrical variation.

SUMMARY OF THE INVENTION

An object of the present invention is to provide a negative pressure detector in an internal combustion engine comprising a detecting section for the negative pressure is formed having an oscillator coil converting the negative pressure into a variation in inductance of the oscillator coil and also of an oscillator detecting the variation in inductance of the oscillator coil as a variation in frequency, the detecting section for the negative pressure being arranged in the vicinity of an inlet manifold.

Another object of the present invention is to provide a negative pressure detector in an internal combustion engine in which an output terminal of the detecting circuit for the negative pressure is connected to an input terminal of an amplifying circuit through a coupling condenser at the output stage, a connecting wire of an earth return circuit and a coupling condenser at the input stage, the oscillation output of the detecting section for the negative pressure is transmitted to the input terminal of the amplifying circuit through the coupling condenser at the output stage, the connecting wire of an earth return circuit and the coupling condenser at the input stage, and a power supply voltage is supplied to the detecting circuit for the negative pressure from the amplifying circuit side through a coil, the connecting wire of an earth return circuit and another coil.

According to the present invention, the variation in negative pressure in the engine can be converted into a variation in inductance by means of the oscillation coil with good response to the negative pressure in the engine, the variation in inductance is converted into a variation in frequency by means of an oscillator in the detecting section for the negative pressure instead of transmitting the variation in inductance to the other circuit through a connecting wire and consequently there is an excellent effect namely the negative pressure in the engine can be detected exactly with a good signal to noise ratio S/N.

Moreover, according to the present invention the detecting circuit for the negative pressure and the amplifying circuit do not interfere with each other, it is economical that the connecting wire can be used commonly without employing another exclusive connecting wire for power supply to the oscillator and connecting sections of both the said circuits can be simplified, consequently there is an excellent effect that it is very useful to apply the means according to the present invention to an electrically controlled fuel injector, etc. in an internal combustion engine.

DESCRIPTION OF THE PREFERRED EMBODIMENTS

Figure 1:
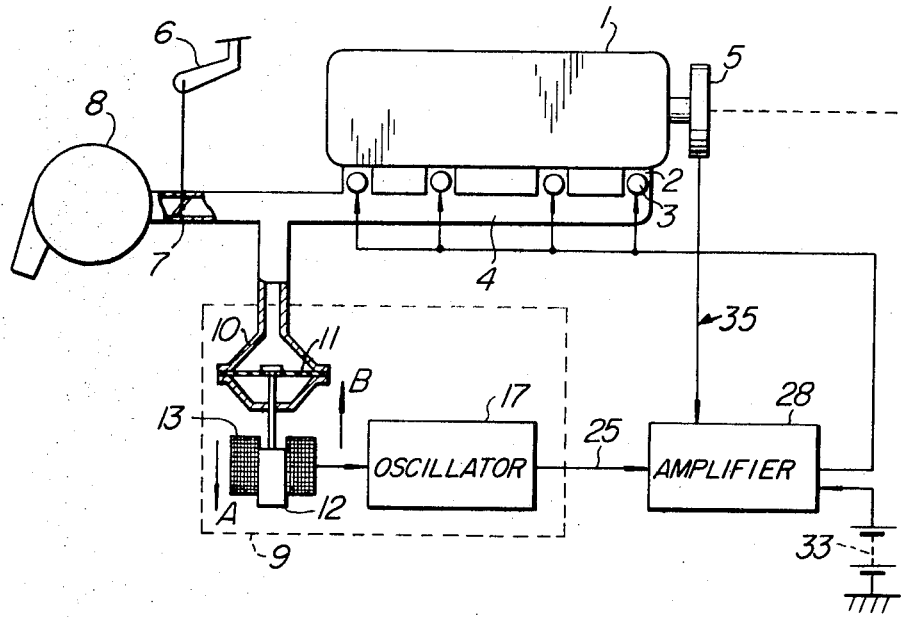
FIG. 1 is a system diagram showing an electrically controlled fuel injector having a negative pressure detector in an internal combustion engine according to an embodiment of the present invention.
Figure 2:
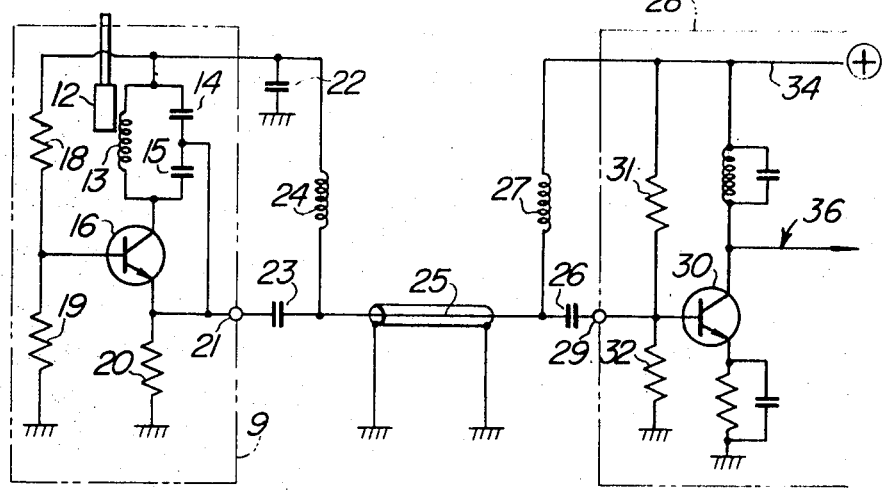
FIG. 2 is a wiring diagram showing a detecting circuit for negative pressure and an amplifying circuit according to an embodiment of the present invention.

The present invention will be described referring to an embodiment shown in the accompanying drawings as follows. In FIGS. 1 and 2, 1 designates an internal combustion engine having 4 cylinders mounted in an automobile, 2 an inlet manifold branch connected to the cylinder, 3 a fuel injection valve arranged in each inlet manifold branches, 4 an inlet manifold, 5 a detecting section for rotation of the engine which converts rotation of the engine into an electrical value, 6 an accelerator pedal, 7 a valve operating interlocked with the accelerator pedal, and 8 an air cleaner filtering out dust contained in air led into each cylinder in the engine 1. Numeral 9 designates a detecting section for negative pressure, 10 a case of a diaphragm, 11 a diaphragm converting the negative pressure in the inlet manifold into a physical variable, 12 a moving iron moving in response to the diaphragm, 13 an oscillation coil wound on the moving iron 12, 14 and 15 are condensers for oscillation, 16 a transistor for oscillation and oscillator 17 is formed by the oscillation coil 13, the condensers 14, 15 and the transistor 16. Numerals 18, 19 and 20 designate bias resistors, 21 an output terminal of the detecting section for negative pressure, 22 a high-frequency bypass condenser, the detecting section for negative pressure 9 is formed by these circuit elements and the detecting section for negative pressure 9 is arranged in the vicinity of the inlet manifold 4. Numeral 23 designates a coupling condenser at the output stage, 24 a coil and 25 a connecting wire employing a coaxial feed cable as shown in the drawing. A power supply voltage is applied to the detecting section for negative pressure 9 from the power supply bus 34 through the coil 27, the connecting wire 25 and the coil 24. In this case, the condensers 23 and 26 act as an insulator for the DC current and hence the DC current does not flow through the condensers 23 and 26. Numeral 26 designates a coupling condenser at the input stage, 27 a coil, 28 an amplifying circuit, 29 an input terminal of the circuit, 30 a transistor of the first stage, 31 and 32 bias resistors, 33 a storage battery in an automobile and 34 a power supply bus one end of which is connected to the positive pole of the storage battery. Numeral 35 denotes a connecting wire conveys the signal generated in a detecting section 5 to an amplifying circuit 28. A wire 36 carries the output of transistor 30, for example, to a pulse width modulator, not shown in the drawing, for operating fuel injection valve 3. These arrangements, with respect to the wires 35 and 36, are not directly connected with the present invention and a detailed explanation thereof has been omitted.

Next, the operation of the device formed as mentioned above according to the present invention will be explained. Here, if the accelerator pedal is stepped on to accelerate an automobile, the valve 7 is opened interlocking with the pedal, as a result of that the negative pressure in the inlet manifold 4 communicating with the inlet manifold branch 2 decreases suddenly and the diaphragm 11 returns to the original standstill position or a position near that position by its elasticity. Here, the response characteristics of the diaphragm 11 is excellent because the diaphragm 11 is arranged in the vicinity of the inlet manifold 4. With this operation, the moving iron 12 moves in the direction to go out from the oscillation coil (the direction shown by arrow A). Then, the oscillation frequency of the oscillator 17 formed of the oscillation coil 13, the condensers 14 and 15, and the transistor 16 increases in proportion to the decrease of inductance of the oscillation coil 13. And oscillation output generated at the emitter of the transistor 16 is applied to the base of the transistor 30 in the amplifying circuit 28 as the output of the detecting section for negative pressure 9 from the output terminal through the coupling condenser at the output stage 23, the connecting wire 25 and the coupling condenser at the input stage 26. At this time, the coils 24 and 27 function as high impedance elements for the oscillation output generated in the detecting circuit for negative pressure 9. So, the high-frequency current due to the oscillation output does not flow into the power source of the detecting section for negative pressure 9 and the amplifying circuit 28. The amplifying circuit 28, when the oscillation output of the detecting circuit for negative pressure 9 is applied to the base of the transistor 30, applies a signal voltage keeping the fuel injection valve 3 open during the time determined by a signal voltage from the detecting section for the rotation of the engine which is in proportion to the rotation of the engine and the frequency of the oscillation output to exciting coils not shown in the drawings arranged at each of the fuel injection valves 3. In the above case wherein the negative pressure of the engine decreases namely the accelerator pedal is stepped on to accelerate the vehicle, the signal voltage, which makes the fuel injection valve 3 open for a longer duration than that before the accelerator pedal is stepped on, is applied to the each exciting coil and the speed of the automobile increases. On the other hand, if a foot releases the accelerator pedal 6 to decrease the speed of the automobile, the negative pressure in the inlet manifold 4 increases suddenly, hence the diaphragm 11 is pulled to the side of the inlet manifold 4 by the negative pressure. With this operation, the moving iron 12 moves in the direction where the part of the moving iron, which was out of the oscillation coil 13 till now goes into the oscillation coil 13 (the direction shown by arrow B). Then, the oscillation frequency of the oscillator 17 formed of the oscillation coil 13, the condensers 14 and 15 and the transistor 16 decreases. Consequently, the amplifying circuit 28 applies a signal voltage, which shortens the open period of the fuel injection valve 3, to the exciting coils arranged at each of the fuel injection valves. Therefore, the speed of the automobile decreases.

I claim:

1. An apparatus for an internal combustion engine for converting variations in negative pressure in an engine into variations in inductance of an oscillation coil, and for generating an electrical signal for controlling the fuel injection valve in said engine comprising:

an oscillator, having an output terminal and power supply terminal and including said oscillation coil, for generating an output signal to be applied to an amplifying circuit connected to said output terminal so that the frequency of said output signal varies in accordance with said variations in inductance of said oscillation coil, an amplifying circuit, having an input terminal for receiving said output signal and a power supply terminal, for producing said electrical signal, said electrical signal varying as a function of variations in the frequency of said oscillator output signal, connecting means connecting said oscillator to said amplifying circuit comprising an input coupling condenser, a connecting wire, and an output coupling condenser connected in series between said output terminal of said oscillator and said input terminal of said amplifying circuit, and high impedance coil means comprising first and second coils, said first coil being connected between said power supply terminal of said oscillator and said connecting wire, and said second coil being connected between said power terminal of said amplifying circuit and said connecting wire.

2. Apparatus as in claim 1, wherein said connecting wire is formed with a coaxial cable.